United States Patent
Vivanco et al.

(10) Patent No.: US 9,226,191 B1
(45) Date of Patent: Dec. 29, 2015

(54) MANAGING UNEVEN DATA FLOW IN A WIRELESS COMMUNICATION NETWORK

(71) Applicant: Sprint Spectrum LP, Overland Park, KS (US)

(72) Inventors: Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 139 days.

(21) Appl. No.: 14/033,307

(22) Filed: Sep. 20, 2013

(51) Int. Cl.
*H04W 28/02* (2009.01)

(52) U.S. Cl.
CPC ................................ *H04W 28/0231* (2013.01)

(58) Field of Classification Search
None
See application file for complete search history.

(56) References Cited

U.S. PATENT DOCUMENTS

| | | | |
|---|---|---|---|
| 8,165,175 | B2 | 4/2012 | Wang et al. |
| 2008/0189970 | A1* | 8/2008 | Wang et al. ..................... 33/701 |
| 2009/0135787 | A1 | 5/2009 | Uemura et al. |
| 2012/0003926 | A1* | 1/2012 | Coldrey et al. ................... 455/9 |
| 2012/0077506 | A1* | 3/2012 | Wietfeldt et al. ............ 455/450 |
| 2013/0084809 | A1* | 4/2013 | Johansson et al. ......... 455/67.11 |
| 2013/0101007 | A1* | 4/2013 | Zhou ............................ 375/227 |

\* cited by examiner

*Primary Examiner* — Noel Beharry
*Assistant Examiner* — Noel E. King (57) ABSTRACT

Systems and methods of managing uneven data flow in a wireless communication system are provided. A network node can receive a load parameter of an access node. The network node can receive a measurement gap criteria of a wireless device in communication with the access node. The network node can receive a traffic characteristic associated with the wireless device. The network node can calculate an anticipated data burst based on the load parameter, the measurement gap criteria, and the traffic characteristic. The network node can determine an adjustment measurement gap criteria for the access node based on the anticipated data burst. The adjusted measurement gap criteria can be transmitted from the network node to the wireless device.

20 Claims, 7 Drawing Sheets

MANAGING UNEVEN DATA FLOW IN A WIRELESS COMMUNICATION NETWORK

TECHNICAL BACKGROUND

A wireless device can communicate over a wireless communication network by establishing communication with an access node of the network. The wireless device can initiate communication with the access node using one of a plurality of available frequency bands. The frequency bands can include frequency bands within the same radio access technology, frequency bands within differing radio access technologies, frequency bands provided by the same network provider, and/or frequency bands provided by different network providers.

While a wireless device can be configured to communicate with a plurality of frequency bands, generally a wireless device can only establish communications over the network using one frequency band at a time. While the wireless device has established communication with the access node using one frequency band, the wireless device can scan for an alternative frequency band to establish communication with the network. A wireless device can scan for alternative frequency bands during a gap in communication transmissions based on a monitoring gap sequence.

During the gap in communication transmissions, the wireless device can scan for all available alternative frequency bands while the data to be transmitted can be stored in a buffer at the access node and/or the wireless device. At the conclusion of the scanning gap, data that has been stored in the buffers can be introduced into the traffic flow. When a large amount of data is introduced to the traffic flow, uneven data flows or "bursts" can occur that can lead to data transmission delays, jitter in data communication, and ultimately deterioration of application performance.

OVERVIEW

Systems and methods of managing uneven data flow in a wireless communication system are provided. A network node can receive a load parameter of an access node. The network node can receive a measurement gap criteria of a wireless device in communication with the access node. The network node can receive a traffic characteristic associated with the wireless device. The network node can calculate an anticipated data burst based on the load parameter, the measurement gap criteria, and the traffic characteristic. The network node can determine an adjustment measurement gap criteria for the access node based on the anticipated data burst. The adjusted measurement gap criteria can be transmitted from the network node to the wireless device.

DETAILED DESCRIPTION

Figure 1:
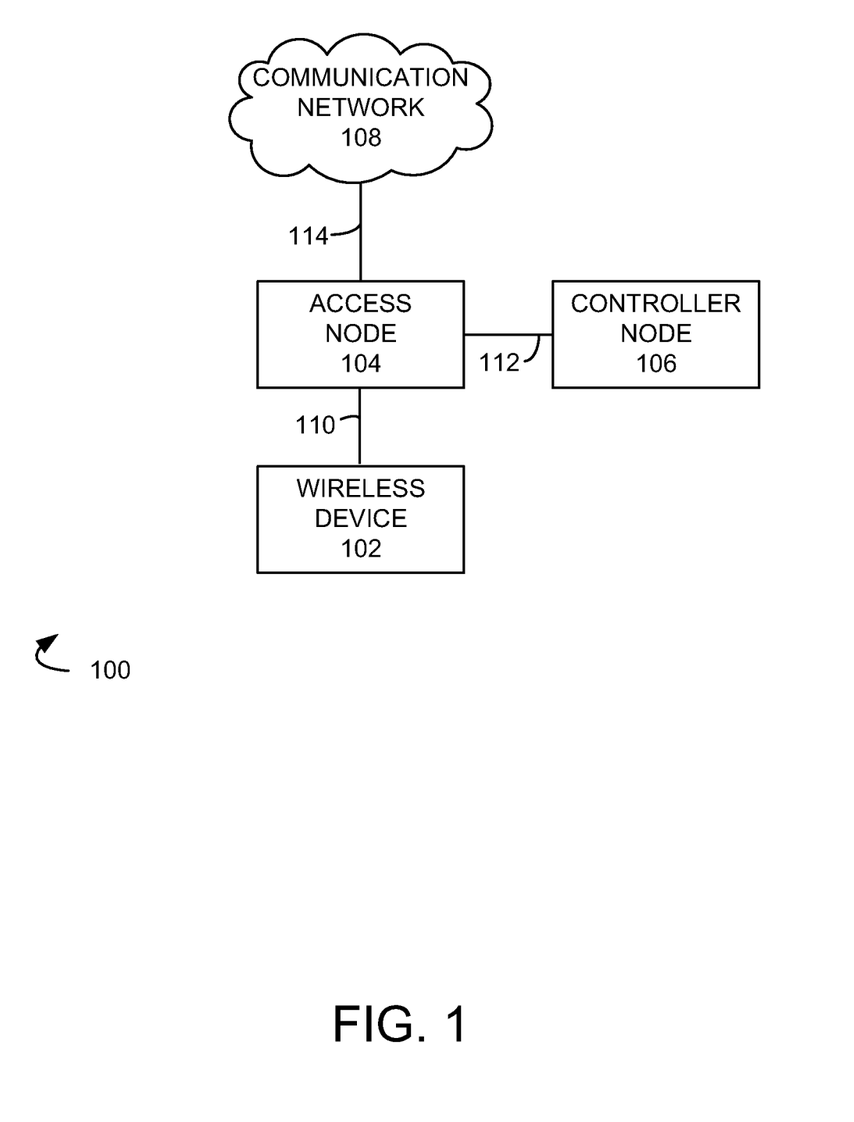
FIG. 1 illustrates a communication system to manage uneven data flow in a wireless communication network.

FIG. 1 illustrates an exemplary communication system 100 for managing uneven data flow in a wireless communication network. Communication system 100 can comprise wireless device 102, access node 104, controller node 106, and communication network 108. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access node 104 and communication network 108, which are omitted for clarity, including additional processing nodes, routers, gateways, and physical and/or wireless data links for carrying data among the various network elements.

Wireless device 102 can be any device configured to communicate over communication system 100 using a wireless interface. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104, any number of wireless devices can be implemented according to various exemplary embodiments disclosed herein.

The wireless interface of wireless device 102 can include a plurality of transceivers, where each transceiver can be associated with a different frequency band. Different frequency bands can be associated with the same or different radio access technologies and/or the same or different network providers. For example, wireless device 102 can include at least one transceiver associated with at least two frequency bands of at least one wireless cellular protocol such as code division multiple access (CDMA), global system for mobile communications (GSM), worldwide interoperability for microwave access (WiMAX), long-term evolution (LTE), and/or high-speed downlink packet access (HSDPA), etc. Alternatively, wireless device 102 can further include a transceiver associated with other types of wireless communication such as IEEE 802.11, wireless fidelity (WiFi), Bluetooth, Zigbee, infrared data association (IrDA), etc.

Wireless device 102 can be in communication with access node 104 through communication link 110. Link 110 can use various communication media, such as air, space, metal, optical fiber, or some other signal propagation path—including combinations thereof. Communication link 110 may comprise many different signals sharing the same link. Communication link 110 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 102 and access node 104 could share the same representative wireless link 110, but be transferred over different communication sessions, frequencies, timeslots, packets, ports, sockets, logical transport links, or in different directions—including combinations thereof.

Wireless device 102 can establish a communication session with access node 104 to communicate information over system 100 using various communication services. These services can include voice and/or data services. For example, mobile voice services, mobile data services, push-to-talk services, internet services, web browsing, email, pictures, picture messaging, video, video messaging, audio, voicemail, music, MP3's, ring tones, stock tickers, new alerts, etc.

Access node 104 can be any network node configured to provide communications to wireless device 102. For example, access node 104 can be selected from a base transceiver station, a radio base station, an eNodeB device, or an enhanced eNodeB device. It is noted that while only one access node 104 is illustrated in FIG. 1, any number of access nodes can be implemented within system 100.

Access node 104 can be configured to establish communication sessions with wireless device 102 over a plurality of frequency bands and/or using a plurality of radio access technologies associated with one or more network operators. In addition, access node 104 can be further configured to provide a plurality of frequency bands within each radio access technology. For example, access node 104 can be configured to establish communication sessions with wireless device over a first, second, third etc. frequency band within the same or different radio access technologies.

A network operator can be a communications provider that provides access to a network where communications are transmitted over the network where a network operator owns and operates the nodes within the network. However, a primary network operator (e.g. home network operator) can enter into relationships with other network operators (e.g. roaming network operators) to share resources such as frequency bands, network environments, etc. For example, multiple network providers may operate in a multi-operator core network environment, and can enter into agreements to share frequency bands or other network resources. Frequency band sharing and/or roaming agreements may be limited in scope, and network providers can share resources of the network while not sharing other resources of the network. For example, one network provider can share one frequency band with a second network provider while not sharing resources of another frequency band.

Access node 104 can comprise a processor and associated circuitry to execute or direct the execution of computer-readable instructions to obtain information. Access node 104 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 104 can receive instructions and other input at a user interface.

Controller node 106 can be any network node configured to communicate information or control information over system 100. Controller node 106 can be a standalone computing device, computing system, or network component, and can be accessible, for example, by a wired or wireless connection, or through an indirect connection such as through a computer network or communication network. For example, controller node 106 can include a mobility management entity (MME), a serving gateway (SGW), a public data network gateway (PGW), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 106 is not limited to any specific technology architecture, such as Long Term Evolution (LTE) and can be used with any network architecture and/or protocol.

Controller node 106 can comprise a processor and associated circuitry to execute or direct the execution of computer-readable instructions to obtain information. Controller node 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 106 can receive instructions and other input at a user interface.

Controller node 106 can be in communication with access node 104 through communication link 112. Access node 104 can be in communication with communication network 108 through communication link 114. Communication links 112, 114 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 112, 114 can be a direct link or might include various equipment, intermediate components, systems, and networks.

Communication network 108 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 108 can be capable of carrying data, for example, to support voice, push-to-talk, and data communications by a wireless device such as wireless device 102. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof.

Data traffic within communication networks can be influenced by an amount of desired information to be communicated within the network as well as the size of the units used to convey the information. For example, large amounts of information can produce long streams of data occupying a large amount of data units while small amounts of information can produce short streams of data that occupy a small amount of data units. A data flow can be referred to as being uneven or "bursty" when the data flow is substantially non-constant or non-smooth, or when it varies rapidly over a period of time.

Data traffic may be transported across digital communication networks using a transport protocol, such as the Transport Control Protocol (TCP). TCP includes congestion control and avoidance methods that determine an appropriate congestion window for a network node or element by increasing the traffic through the network node until packet loss is detected. The use of an additive increase/multiplicative decrease (AMID) feedback control algorithm in TCP causes a dramatic reduction in the rate of packet transmission from a network node when congestion is detected. Within TCP, data flows can be characterized as short-lived and long-lived.

Long-lived data flows begin in the TCP slow start phase, and can end in the TCP congestion avoidance phase in which AMID congestion control is applied. Short-lived data flows can only reach the TCP slow start phase, in which the TCP congestion window is increased exponentially. Examples of short-lived TCP flows includes traffic related to web-browsing, email, instant messaging, SMS messaging, and so forth. Examples of long-lived TCP flows include streaming audio, video, and multimedia information, file transfer (FTP) traffic, Telnet traffic, and the like.

While short-lived TCP flows can carry a small amount of the total information conveyed by a communication network, they can represent a large percentage of the TCP data flows. The presence of short-lived TCP flows can indicate uneven data flow, and as the number of short-lived TCP flows increases, the volume of uneven data flow can be determined to increase. Where information is divided into units for transport, such as data packets, it is likely that the last unit comprises less data than the preceding units. For example, where data packets are transmitted to a wireless device over a wireless communication link at different time transmission intervals (TTIs), the last TTI will can comprise less data than the other (preceding, or non-final) data packets.

High variability in data flow evenness can cause jitter and/or throughput delay in a communication network. Uneven data flows can be caused by numerous factors including network congestion, wireless device mobility, variations in the wireless communication environment, and varying use of wireless communication link resources over time (such as using different carriers, or different modulation and coding schemes over a carrier), among other things. Determinations of the presence and quantity of uneven data flows in a communication network are important for network configuration, operation and planning.

In operation, wireless device 102 can be configured to communicate with access node 104 using various frequency bands associated with one or more radio access technologies of one or more network providers. After wireless device 102 establishes communication with access node 104 using one frequency band, it can be determined that wireless device 102 needs to perform a scan for alternative frequency bands. For example, access node 104 can determine that wireless device 102 needs to perform an inter-frequency and inter-radio access technology scan for all available frequency bands.

The determination to perform the scan can be made at any time such as prior to establishing a communication session, during an active communication session, and/or during an inactive communication session (e.g. during idle mode of the wireless device). Such determination can be made by any network node such as wireless device 102, access node 104, or controller node 106. When the scan is to be performed during an active communication session, wireless device 102 can perform the scan based on a monitoring gap pattern sequence. Wireless device 102 can store the monitoring gap pattern sequence where access node 104 can transmit the monitoring gap pattern sequence to wireless device 102 at any time. For example, access node 104 can transmit the monitoring gap pattern sequence when wireless device 102 initiates a communication session with access node 104 and/or after a communication session is already established.

The monitoring gap pattern sequence can include parameters such as a gap pattern, a gap timer start time, a gap timer ending time, a gap timer duration, a gap starting time, and a gap ending time. Some of the parameters of the monitoring gap pattern sequence can be defined by a communication standard such as the gap pattern and the gap timer duration. For example, in various exemplary embodiments, the LTE standard defines the monitoring gap pattern as containing gaps every N LTE frames where the gap periodicity is a multiple of 10 milliseconds (ms). As defined in the standard, the gaps can have a 6 ms duration where a single monitoring gap pattern is used to monitor all possible frequency bands such as inter-frequency LTE FDD and TDD, UMTS FDD, GSM, TD-SCDMA, CDMA2000 1x, CDMA2000 HRPD, etc. There are two gap patterns defined by the standard 0 and 1 where the gap pattern associated with 0 includes a gap length of 6 ms where the measurement gap is repeated every 40 ms and the gap pattern associated with 1 includes a gap length of 6 ms where the measurement gap is repeated every 80 ms. However, all parameters can be further defined or modified by network operators.

Figure 2:
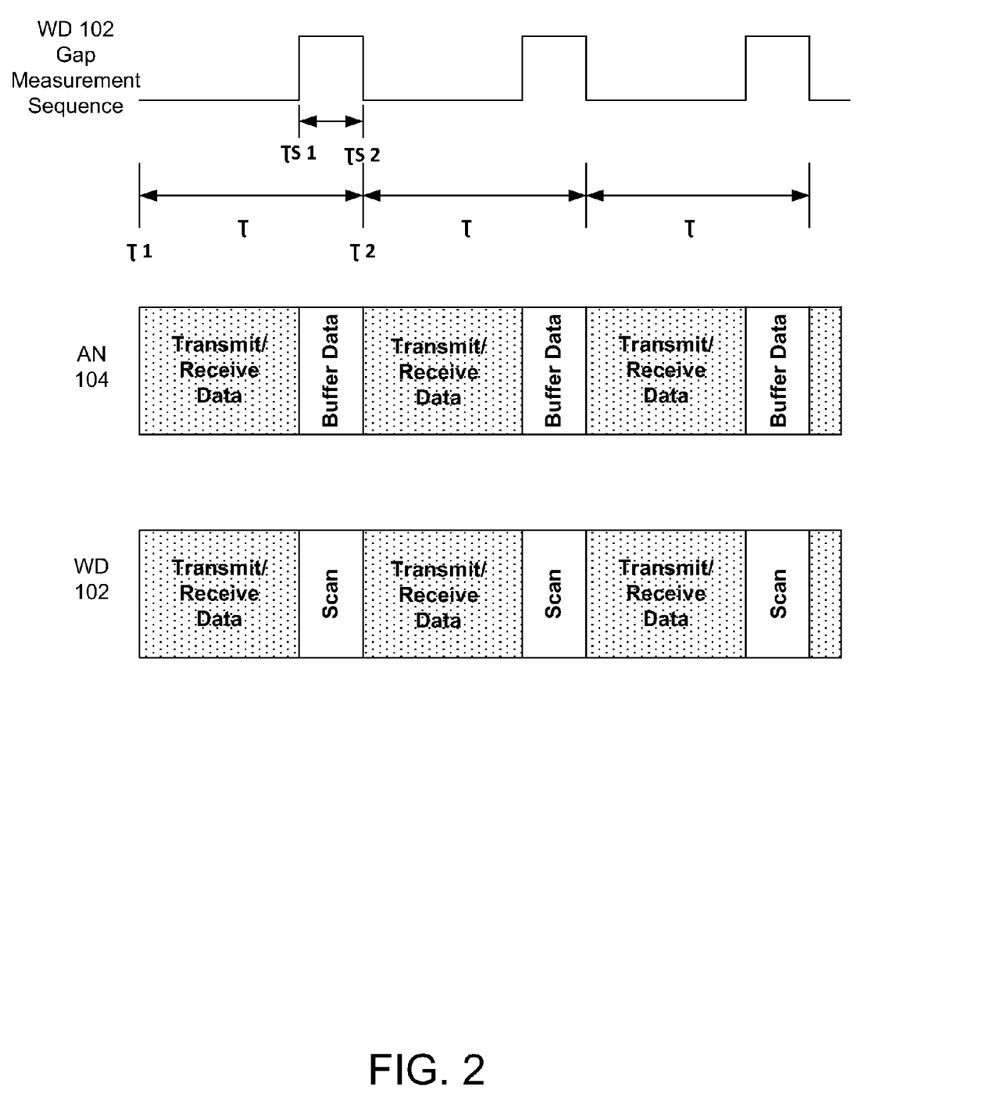
FIG. 2 illustrates an exemplary gap measurement sequence according to an exemplary embodiment of the present disclosure.

Wireless device 102 can initiate a monitoring gap pattern sequence as illustrated in FIG. 2. For example, the monitoring gap pattern can have a gap timer duration $T$, gap timer starting time $T1$, and a gap timer ending time $T2$. The monitoring gap pattern sequence can be initiated automatically or in response to instructions from access node 104. For example, during an active RRC Connected mode, access node 104 can instruct wireless device 102 to initiate the monitoring gap pattern sequence.

The gap timer can be initiated at $T1$ and during the time between the gap timer initiation $T1$ and the gap scan starting time $TS1$, the access node 104 can transmit and receive information from wireless device 102 and wireless device 102 can transmit and receive information from access node 104. One of ordinary skill in the art would recognize that while the gap timer duration $T$ is illustrated in FIG. 2 as ending concurrently with gap scan ending time, the gap scanning period can occur any time during the gap timer duration such as at the beginning of the timer duration or in the middle of the timer duration.

At $TS1$, wireless device 102 can switch to another frequency band to begin scanning for all possible frequency bands such as frequency bands within the same radio access technology, frequency bands within different radio access technologies, frequency bands associated with the same or different network operators, and/or frequency bands associated with access node 104 or other access nodes (not illustrated). Wireless device 102 can monitor various measurements of each frequency band such as signal strength, interference, etc. After the gap scan ending time $TS2$, wireless device 102 can transmit the results of the scan (e.g. measurement reports) to access node 104 where the access node 104 determines whether to initiate handover procedures for wireless device 102 based on the measurement reports.

During the gap scan, access node 104 and/or wireless device 102 can buffer any data scheduled to be transmitted. For example, wireless device 102 can be engaged in uplink activities, downlink activities, or both where during that time data is stored in a buffer at both the access node 104 and/or the wireless device 102 based on the direction (uplink or downlink) of the data transmission. After the gap scan ending time, data buffered at the access node 104 and wireless device 102 is released causing uneven data flow.

An estimated amount of uneven data flow can be determined based on the load of the access node 104, the measurement gap sequence used by wireless device 102, and/or traffic characteristics associated with the data. For example, controller node 106 can calculate an anticipated data burst based on a load parameter of access node 104, a measurement gap criteria of wireless device 102, and a data traffic characteristic associated with the wireless device 102.

After an anticipated data burst is calculated, controller node 106 can determine whether to change the current monitoring gap pattern sequence stored at wireless device 102. For example, the monitoring gap pattern sequence can be changed from 0 to 1 or 1 to 0 as defined in the standard, the start time of the gap timer can be modified such that the timer duration starts sooner or later than previously occurred, and/or the scan gap duration can be modified to be shortened or lengthened such that the wireless device 102 scans for the alternative frequencies for a longer or shorter period than is defined in the standard. When the controller node 106 decides to modify the monitoring gap pattern sequence, controller node 106 can instruct access node 104 to transmit an adjusted measurement gap criteria to the wireless device 102.

Figure 3:
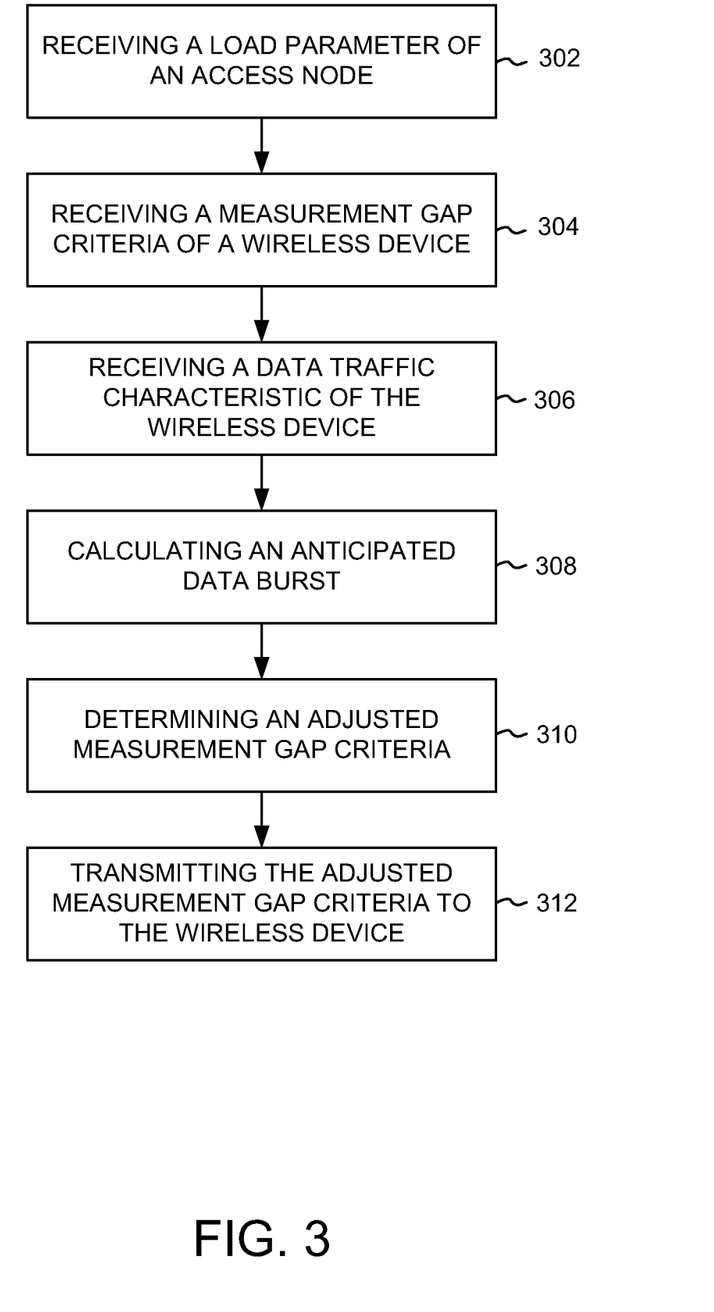
FIG. 3 illustrates an exemplary method of managing uneven data flow in a wireless communication network.

FIG. 3 illustrates a flow chart of an exemplary method of managing uneven data flow in a wireless communication network. The method will be discussed with reference to the exemplary communication system 100 illustrated in FIG. 1. However, the method can be implemented with any suitable communication system. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

A network node can receive a load parameter of an access node at 302. For example, controller node 106 can receive the load parameter from access node 104. The load parameter can include at least one of a maximum path loss or a target loading criteria. A maximum path loss can be indicative of the geographical area (e.g. subscriber area) in which the signal associated with a frequency band transmits within a predetermined threshold from the access node 104. A target loading criteria can be related to the number of wireless devices in communication with access node 104. For example, the number of wireless devices that have currently established communication with access node 106. Alternatively, or additionally, a device subscription threshold can be transmitted to controller node 106 where the subscription threshold of access node 104 can be a maximum number of wireless devices that can establish a communication link with access node. Controller node 106 can request the load parameter from access node 104. Alternatively, access node 104 can automatically transmit the load parameter after predetermined periods or after a triggering event such a wireless device initiating communication with access node 104.

At 304, the network node can receive a measurement gap criteria of a wireless device. For example, access node 104 and/or wireless device 102 can transmit the measurement gap criteria. The measurement gap criteria can comprise at least one of a gap pattern, a gap timer duration, gap timer starting time, gap timer ending time, a gap scan starting time, and a gap scan ending time. The gap pattern can be related to the predetermined patterns defined in the standard such as 0, 1. Alternatively, the gap pattern can be dynamically determined by the wireless device 102 and/or access node 104. The gap timer duration can be indicative of the amount of time the wireless device 102 and/or the access node 104 transmit and receive data as well as the amount of time the wireless device 102 scans for other available frequency bands. The gap timer starting time can be indicative of the starting time of each gap pattern period in the sequence. The gap timer ending time can be indicative of the ending time of each gap pattern period in the sequence. The gap scan starting time and the gap scan ending time can be indicative of when the gap scan is initiated within each gap pattern period and how long the scan can be performed.

The network node can receive a data traffic characteristic associated with the wireless device at 306. For example, controller node 106 can receive or determine at least one data traffic characteristics associated with the data flows communicated between wireless device 102 and access node 104. A data traffic characteristic can comprise at least one of signal power in the uplink, signal power in the downlink, rate at which data is transmitted from the wireless device to the access node, rate at which data is transmitted from the access node to the wireless device, and application requirements. Application requirements can include a minimum data rate required by an application running on the wireless device, a maximum permitted data delay, a minimum throughput, a minimum error rate, a maximum data loss rate, an application type, and a modulation and coding scheme.

At 308, the network node can calculate an anticipated data burst. For example, controller node 106 can determine an anticipated data burst that will occur in the network based on the load parameter of the access node, the measurement gap criteria associated with the wireless device, and the data traffic characteristic. When the anticipated data burst exceeds a predetermined threshold, the network node can determine an adjusted measurement gap criteria at 310 and transmit the adjusted measurement gap criteria to the wireless device at 312.

Figure 4:
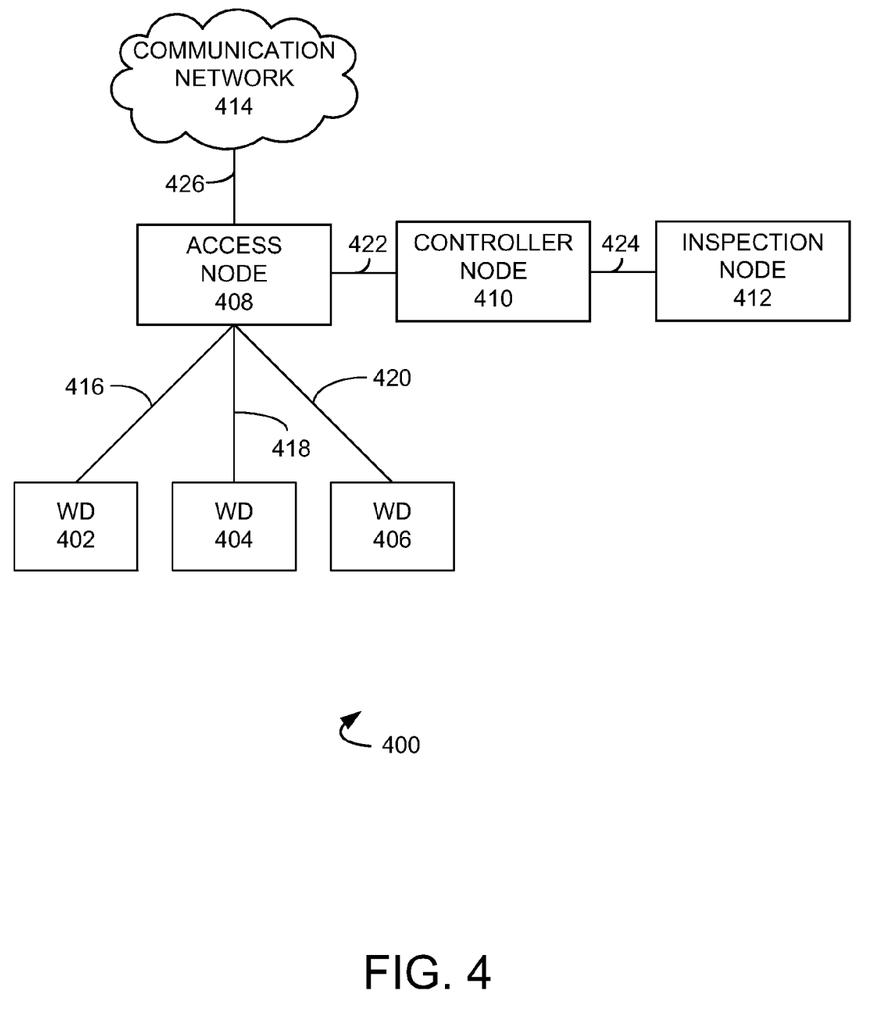
FIG. 4 illustrates another exemplary communication system to manage uneven data flow in a wireless communication network.

FIG. 4 illustrates an exemplary communication system 400 for managing uneven data flow in a wireless communication network. Communication system 400 can comprise wireless devices 402, 404, 406, access node 408, controller node 410, inspection node 412, and communication network 414. Other network elements may be present in the communication system 400 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access node 408 and communication network 414, which are omitted for clarity, including additional processing nodes, routers, gateways, and physical and/or wireless data links for carrying data among the various network elements.

Wireless devices 402, 404, 406 can be any device configured to communicate over communication system 400 using a wireless interface. For example, wireless devices 402, 404, 406 can include a cell phone, a smart phone, a computing platform such as a laptop, palmtop, or a tablet, a personal digital assistant, or an internet access device, and combinations thereof. It is noted that while three wireless devices are illustrated in FIG. 4 as being in communication with access node 408, any number of wireless devices can be implemented according to various exemplary embodiments disclosed herein.

The wireless interface of wireless devices 402, 404, 406 can include a plurality of transceivers, where each transceiver can be associated with a different frequency band. Different frequency bands can be associated with the same or different radio access technologies and/or the same or different network providers. For example, wireless devices 402, 404, 406 can include at least one transceiver associated with at least two frequency bands of at least one wireless cellular protocol such as code division multiple access (CDMA), global system for mobile communications (GSM), worldwide interoperability for microwave access (WiMAX), long-term evolution (LTE), and/or high-speed downlink packet access (HSDPA), etc. Alternatively, wireless devices 402, 404, 406 can further include a transceiver associated with other types of wireless communication such as IEEE 802.11, wireless fidelity (WiFi), Bluetooth, Zigbee, infrared data association (IrDA), etc.

Wireless device 402 can be in communication with access node 408 through communication link 416. Wireless device 404 can be in communication with access node 408 through communication link 418. Wireless device 406 can be in communication with access node 408 through communication link 420. Links 416, 418, 420 can use various communication media, such as air, space, metal, optical fiber, or some other signal propagation path—including combinations thereof. Communication links 416, 418, 420 may comprise many different signals sharing the same link. Communication links 416, 418, 420 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 402 and access node 408 could share the same representative wireless link 416, but be transferred over different communication sessions, frequencies, timeslots, packets, ports, sockets, logical transport links, or in different directions—including combinations thereof.

Wireless devices 402, 404, 406 can establish a communication session with access node 408 to communicate information over system 400 using various communication services. These services can include voice and/or data services. For example, mobile voice services, mobile data services, push-to-talk services, internet services, web browsing, email, pictures, picture messaging, video, video messaging, audio, voicemail, music, MP3's, ring tones, stock tickers, new alerts, etc.

Access node 408 can be any network node configured to provide communications to wireless devices 402, 404, 406. For example, access node 408 can be selected from a base transceiver station, a radio base station, an eNodeB device, or an enhanced eNodeB device. It is noted that while only one access node 408 is illustrated in FIG. 4, any number of access nodes can be implemented within system 400.

Access node 408 can be configured to establish communication sessions with wireless devices 402, 404, 406 over a plurality of frequency bands and/or using a plurality of radio access technologies associated with one or more network operators. In addition, access node 408 can be further configured to provide a plurality of frequency bands within each radio access technology. For example, access node 408 can be configured to establish communication sessions with wireless device over a first, second, third etc. frequency band within the same or different radio access technologies.

A network operator can be a communications provider that provides access to a network where communications are transmitted over the network where the network operator owns and operates the nodes within the network. However, a primary network operator (e.g. home network operator) can enter into relationships with other network operators (e.g. roaming network operators) to share resources such as frequency bands, network environments, etc. For example, multiple network providers may operate in a multi-operator core network environment, and can enter into agreements to share frequency bands or other network resources. Frequency band sharing and/or roaming agreements may be limited in scope, and network providers can share resources of the network while not sharing other resources of the network. For example, one network provider can share one frequency band with a second network provider while not sharing resources of another frequency band.

Access node 408 can comprise a processor and associated circuitry to execute or direct the execution of computer-readable instructions to obtain information. Access node 408 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 408 can receive instructions and other input at a user interface.

Controller node 410 can be any network node configured to communicate information or control information over system 400. Controller node 410 can be a standalone computing device, computing system, or network component, and can be accessible, for example, by a wired or wireless connection, or through an indirect connection such as through a computer network or communication network. For example, controller node 410 can include a mobility management entity (MME), a serving gateway (SGW), a public data network gateway (PGW), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 410 is not limited to any specific technology architecture, such as Long Term Evolution (LTE) and can be used with any network architecture and/or protocol.

Controller node 410 can comprise a processor and associated circuitry to execute or direct the execution of computer-readable instructions to obtain information. Controller node 410 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 410 can receive instructions and other input at a user interface.

Inspection node 412 can be a network node configured to inspect various properties associated with the network. For example, inspection node 412 can, among other things, perform deep packet inspection of packets sent from and/or to wireless devices 402, 404, 406. Deep packet inspection generally involves an inspection of packets beyond Open Systems Interconnection (OSI) layer 3 including an inspection of the data portion of a packet (and possibly also the header of a packet). In an exemplary embodiment, traffic information relating to each wireless device 402, 404, 406 can be determined including traffic flow profiles and congestion control mechanism modes.

Inspection node 412 can comprise a processor and associated circuitry to execute or direct the execution of computer-readable instructions. Inspection node 412 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

Controller node 410 can be in communication with access node 408 through communication link 422 and in communication with inspection node 412 through communication link 424. Access node 408 can be in communication with communication network 414 through communication link 426. Communication links 422, 424, 426 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 422, 424, 426 can be a direct link or might include various equipment, intermediate components, systems, and networks Communication network 414 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 414 can be capable of carrying data, for example, to support voice, push-to-talk, and data communications by a wireless device such as wireless devices 402, 404, 406. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication system 414 comprise Ethernet, Fast Ethernet, Gigabit Ethernet, LocalTalk (such as Carrier Sense Multiple Access with Collision Avoidance), Token Ring, Fiber Distributed Data Interface (FDDI), and Asynchronous Transfer Mode (ATM). Communication network 414 can also comprise additional base stations, controller nodes, telephony switches, internet routers, network gateways, computer systems, communication links, or some other type of communication equipment, and combinations thereof.

In operation, wireless devices 402, 404, 406 can be configured to communicate with access node 408 using various frequency bands associated with one or more radio access technologies of one or more network providers. After wireless devices 402, 404, 406 establish communication with access node 408 using one frequency band, it can be determined that one or more of the wireless devices 402, 404, 406 needs to perform a scan for alternative frequency bands. For example, access node 408 can determine that wireless devices 402, 404, 406 need to perform an inter-frequency and/or inter-radio access technology scan for all available frequency bands.

When a scan for available frequency bands is to be performed during an active communication session, wireless devices 402, 404, 406 can perform the scan based on a monitoring gap pattern sequence for each wireless device. Each wireless device 402, 404, 406 can store the monitoring gap pattern sequence where each monitoring gap pattern sequence can be the same or different for each wireless device.

Figure 5:
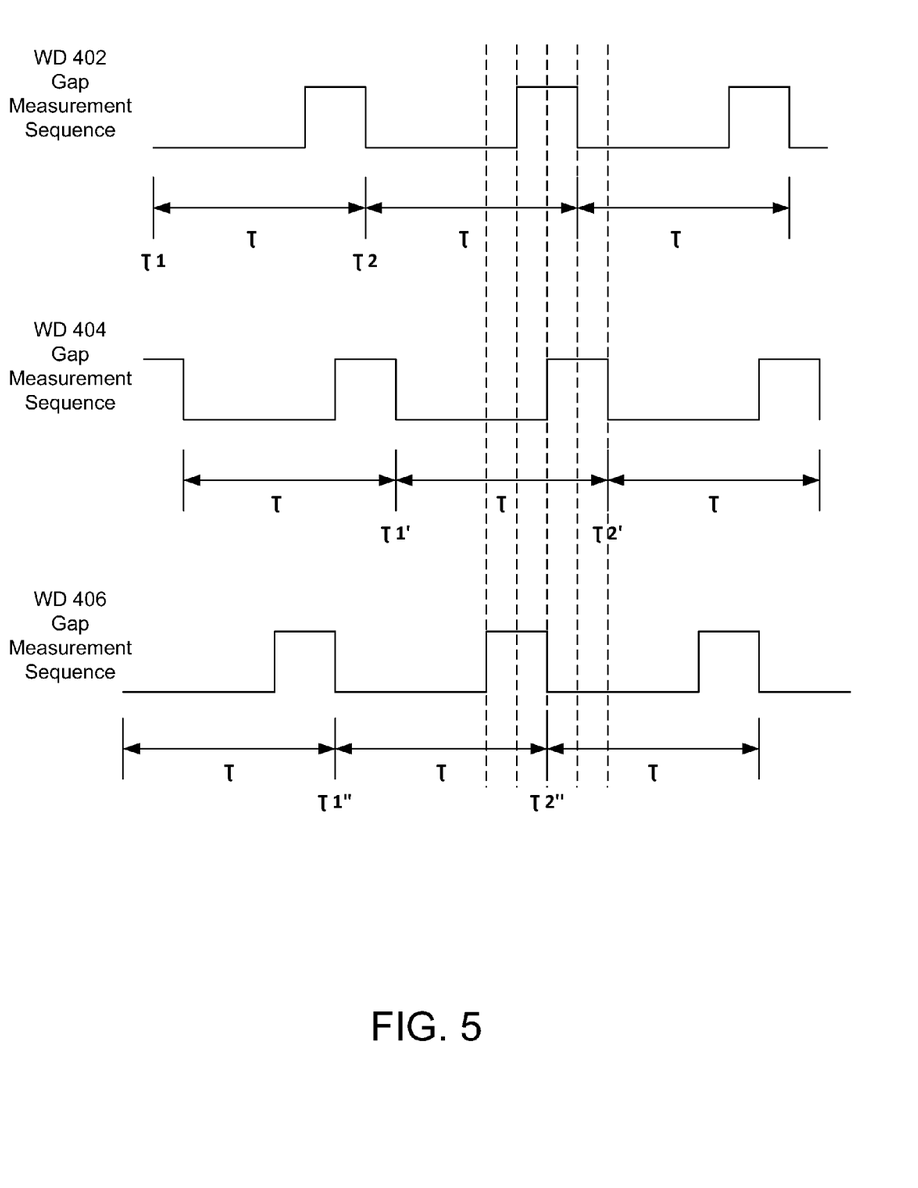
FIG. 5 illustrates exemplary gap measurement sequences according to an exemplary embodiment of the present disclosure.

Wireless devices 402, 404, 406 can each initiate a monitoring gap pattern sequence as illustrated in FIG. 5. For example, each monitoring gap pattern can have the same gap timer duration $T$. However, each pattern can have different gap timer starting times $T_1, T_1', T_1''$ and a gap timer ending time $T_2, T_2', T_2''$ where some portion of each scan gap can overlap at least one other wireless device scan gap. The monitoring gap pattern sequence can be initiated automatically or in response to instructions from access node 408. For example, during an active RRC Connected mode, access node 408 can instruct wireless devices 402, 404, 406 to initiate the monitoring gap pattern sequence.

When scan gaps for a plurality of wireless devices 402, 404, 406 overlap, the release of data from the buffer associated with access node 408 and the buffers of the wireless devices 402, 404, 406 also overlaps causing uneven or bursty data flow. In order to reduce the amount of uneven or bursty data flows caused by overlapping scan gaps, the monitoring gap pattern sequence for each wireless device 402, 404 406 can be modified to reduce the amount of uneven data traffic which can cause undesirable data transmission delays, jitter in data communication, and ultimately deterioration of application performance.

The monitoring gap pattern sequence for each wireless device 402, 404, 406 can be modified based on an estimated data burst. The estimated data burst can be calculated based on the load parameter of access node 408, the measurement gap criteria of each wireless device 402, 404, 406, and the traffic characteristic of each wireless device 402, 404, 406. In an exemplary embodiment, controller node 410 can receive a load parameter from access node 408 and measurement gap criteria for each wireless device 402, 404, 406 in communication with access node 408. In addition, controller node 410 can receive at least one traffic characteristic for each wireless device 402, 404, 406 where the at least one traffic characteristic can be received from inspection node 412. Controller node 410 can then estimate the amount of uneven traffic flows anticipated by overlapping measurement gaps.

In an exemplary embodiment, controller node 410 can estimate an ending gap scan time for each wireless device engaged in scanning activities. For example, during a predetermined measuring time period such as fifteen minutes, controller node 410 can calculate the estimated ending gap scan times for each gap timer duration associated with each wireless device within the predetermined measuring period. Controller node 410 can then identify which gap scan ending times are anticipated to overlap within a predetermined overlap period. For instance, as illustrated in FIG. 5, the gap ending time $T_2''$ of wireless device 406 can overlap the gap scanning period of wireless device 404.

After all estimated gap scan ending times are identified, controller node 410 can then determine whether the estimated gap ending time is within a predetermined release threshold.

For example, estimated gap ending times for different wireless devices can be considered to be within the predetermined release threshold when the absolute value of the difference between the estimated gap ending times is less than the predetermined release threshold ($|tx_i - ty_j| <$ predetermined relase threshold where $tx_i$ is the estimated ending time of the scan gap of a first wireless device and $ty_j$ is the estimated ending time of the scan gap of a second wireless device). The predetermined release threshold can be, for example, 5 ms. When the absolute value of the difference between the estimated gap ending times is less than the predetermined release threshold, controller node 410 can calculate an estimated data burst factor. The estimated data burst factor ($\gamma$) can be calculated using the following equation:

$$\gamma = (\text{bit rate } WD1 * \text{measuring gap } WD1) + (\text{bit rate } WD2 * \text{measuring gap } WD2) + (\text{bit rate } WD3 * \text{measuring gap } WD3)$$

In the above equation, bit rate can be the data rate that the associated wireless device is currently transmitting and the measuring gap can be the amount of time the associated wireless device was buffering data at the estimated ending time. The estimated data burst factor can be aggregated for all wireless devices in communication with access node 408. The estimated data burst factor ($\gamma$) can be repeatedly calculated for each overlapping gap ending time where each calculated data burst factor ($\gamma$) is stored for the predetermined measuring time period. While variables are associated with three wireless devices, one of ordinary skill in the art would recognize that the number of wireless device variables aggregated in the above estimated data burst factor equation is equal to the number of wireless devices in communication with the access node.

After the predetermined measuring time period elapses, controller node 410 can determine the median data burst factor ($\epsilon$) for the predetermined period. The median data burst factor ($\epsilon$) can be indicative of the likelihood of uneven data flow being introduced into the data traffic. For example, the larger the median data burst factor ($\epsilon$), the more likely data traffic will be undesirably influenced due to the release of the data from the buffers of access node 408 and wireless devices 402, 404, 406.

Controller node 410 can then determine whether to adjust the measurement gap pattern sequence for at least one wireless device 402, 404, 406 to reduce overlapping scan ending periods. For example, controller node 410 can determine whether to modify the monitoring gap pattern sequence from 0 to 1 or 1 to 0 as defined in the standard, the start time of the gap timer such that the timer duration starts sooner or later than previously occurred, and/or the scan gap duration to be shorter or longer such that at least one wireless device 402, 404, 406 can scan for the alternative frequencies for a longer or shorter period than is defined in the standard.

When the controller node 410 decides to modify the monitoring gap pattern sequence, controller node 410 can instruct access node 408 to transmit an adjusted measurement gap criteria to at least one of the wireless devices 402, 404, 406. In an exemplary embodiment, controller node 410 can decide which wireless devices to modify the monitoring gap pattern sequence based on the median data burst factor ($\epsilon$). For example, when $\epsilon$ is large and the access node 408 is experiencing heavy data traffic, controller node 410 can modify 100% of the monitoring gap pattern sequences. When $\epsilon$ is large and the access node 408 is experiencing medium data traffic, controller node 410 can modify 60% of the monitoring gap pattern sequences. When $\epsilon$ is medium and the access node 408 is experiencing heavy data traffic, controller node 410 can modify 40% of the monitoring gap pattern sequences.

Figure 6:
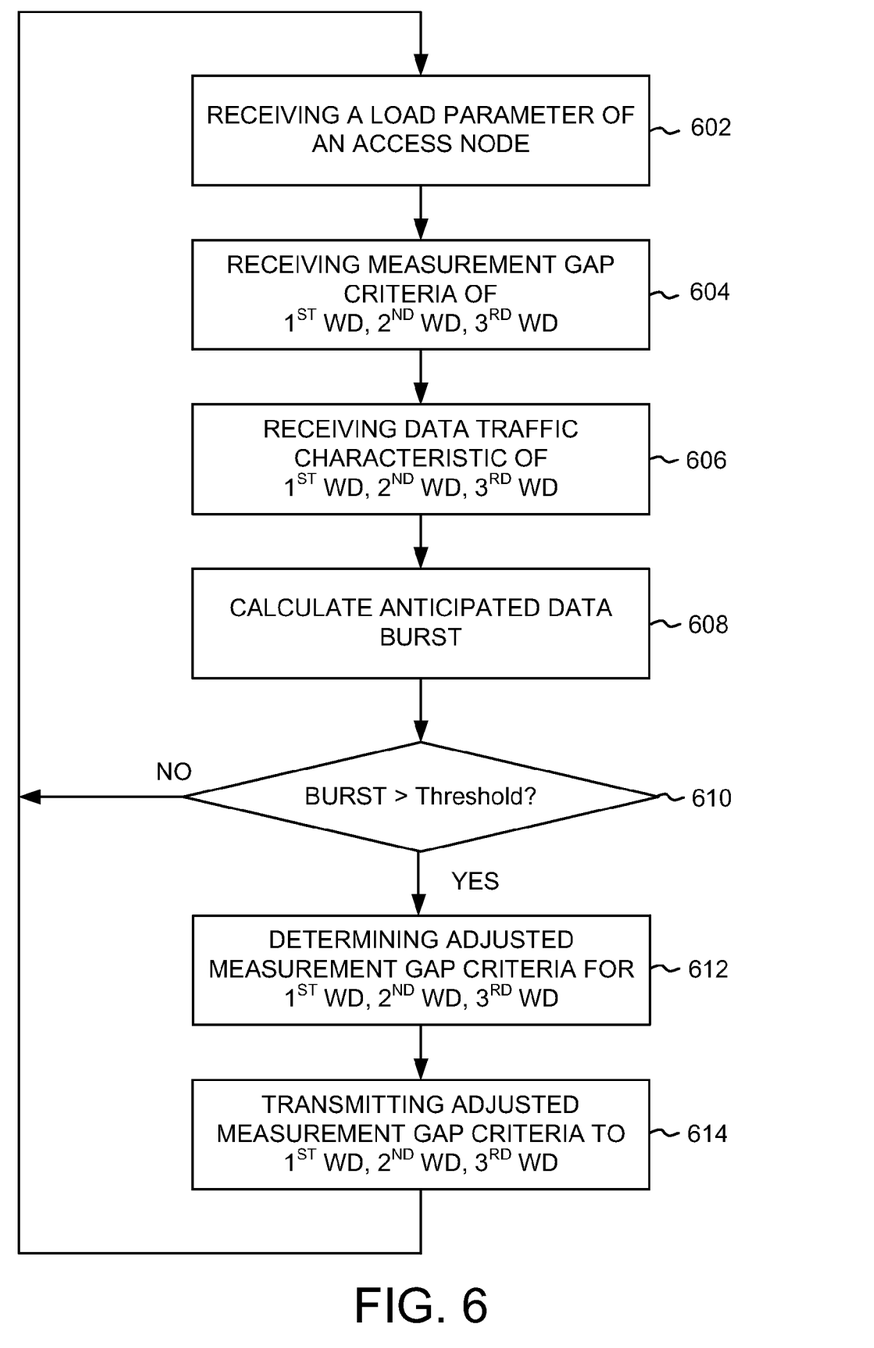
FIG. 6 illustrates another exemplary method of managing uneven data flow in a wireless communication network.

FIG. 6 illustrates a flow chart of an exemplary method of managing uneven data flow in a wireless communication network. The method will be discussed with reference to the exemplary communication system 400 illustrated in FIG. 4. However, the method can be implemented with any suitable communication system. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

A network node can receive a load parameter of an access node at 602. For example, controller node 410 can receive the load parameter from access node 408. The load parameter can include at least one of a maximum path loss or a target loading criteria. A maximum path loss can be indicative of the geographical area (e.g. subscriber area) in which the signal associated with a frequency band transmits within a predetermined threshold from the access node 408. A target loading criteria can be related to the number of wireless devices in communication with access node 408. For example, the number of wireless devices that have currently established communication with access node 408. Alternatively, or additionally, a device subscription threshold can be transmitted to controller node 408 where the subscription threshold of access node 408 can be a maximum number of wireless devices that can establish a communication link with access node. Controller node 410 can request the load parameter from access node 408. Alternatively, access node 408 can automatically transmit the load parameter after predetermined periods or after a triggering event such a wireless device initiating communication with access node 408.

At 604, the network node can receive a measurement gap criteria for each wireless device. For example, access node 408 and/or wireless devices 402, 404, 406 can transmit the measurement gap criteria to controller node 408. The measurement gap criteria can comprise at least one of a gap pattern, a gap timer duration, gap timer starting time, gap timer ending time, a gap scan starting time, and a gap scan ending time. The gap pattern can be related to the predetermined patterns defined in the standard such as 0, 1. Alternatively, the gap pattern can be dynamically determined by each wireless device 402, 404, 406 and/or access node 408. The gap timer duration can be indicative of the amount of time the wireless device 402, 404, 406 and/or the access node 408 transmit and receive data as well as the amount of time each wireless devices 402, 404, 406 scans for other available frequency bands. The gap timer starting time can be indicative of the starting time of each gap pattern period in the sequence. The gap timer ending time can be indicative of the ending time of each gap pattern period in the sequence. The gap scan starting time and the gap scan ending time can be indicative of when the gap scan is initiated within each gap pattern period and how long the scan can be performed.

The network node can receive a data traffic characteristic associated with each wireless device at 606. For example, controller node 408 can receive from inspection node 412 at least one data traffic characteristic associated with the data flows communicated between wireless devices 402, 404, 406 and access node 408. A data traffic characteristic can comprise at least one of signal power in the uplink, signal power in the downlink, rate at which data is transmitted from the wireless device to the access node, rate at which data is transmitted from the access node to the wireless device, and application requirements. Application requirements can include a minimum data rate required by an application running on the wireless device, a maximum permitted data delay, a minimum throughput, a minimum error rate, a maximum data loss rate, an application type, and a modulation and coding scheme.

At 608, the network node can calculate an anticipated data burst and compare the anticipated data burst to a predetermined threshold at 610. For example, controller node 410 can determine the anticipated data burst that will occur in the network based on the load parameter of the access node 408, the measurement gap criteria associated with each wireless device 402, 404, 406, and the data traffic characteristic of each wireless device 402, 404, 406. When the anticipated data burst exceeds the predetermined threshold, the network node can determine an adjusted measurement gap criteria for at least one of the wireless devices 402, 404, 406 at 612 and transmit the adjusted measurement gap criteria to the associated wireless devices 402, 404, 406 at 614.

Figure 7:
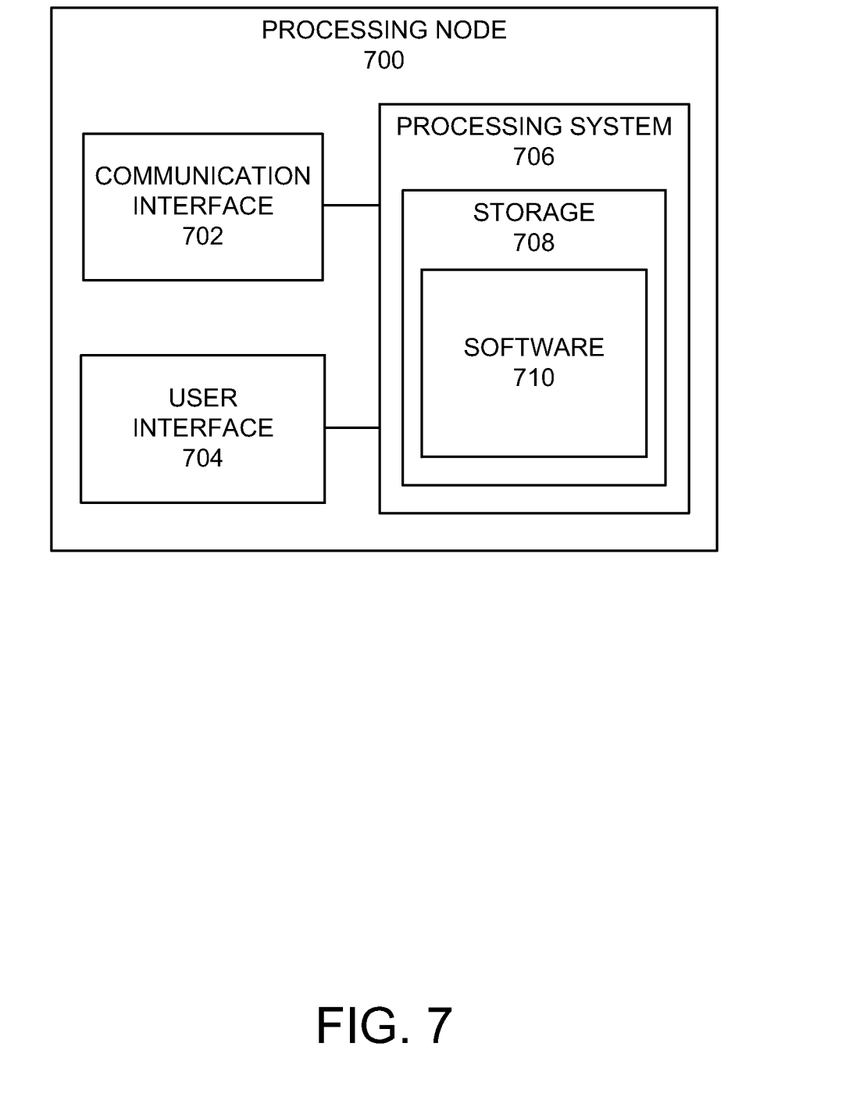
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 is capable of monitoring communications in a communication network. Processing system 706 includes storage 708, which can comprise a disk drive, flash drive, memory circuitry, or other memory device. Storage 708 can store software 710 which is used in the operation of the processing node 700. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access nodes 104, 408, controller nodes 106, 410, and inspection node 412. Processing node 700 can also be an adjunct or component of a network element, such as an element of access nodes 104, 408, controller nodes 106, 410, and inspection node 412. Processing node 700 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing uneven data flow in a wireless communication system, comprising:
   determining a load parameter of an access node;
   receiving a measurement gap criteria associated with each of a plurality of wireless devices in communication with the access node;
   receiving, from an inspection node, a traffic characteristic associated with each of the plurality of wireless devices;
   monitoring a buffer associated with each of the plurality of wireless devices during overlapping scan gaps of the plurality of wireless devices to estimate an anticipated data burst, wherein the anticipated data burst is estimated based on the determined load parameter, the measurement gap criterias, and the traffic characteristics;
   calculating a data burst factor based on the estimated data burst;
   modifying the measurement gap criteria for at least one wireless device based on the calculated data burst factor; and
   transmitting the modified measurement gap criteria to the at least one wireless device.

2. The method of claim 1, wherein the load parameter comprises at least one of a maximum path loss between the access node and each of the plurality of wireless devices and a target loading criteria.

3. The method of claim 1, wherein the measurement gap criteria comprises at least one of a gap pattern, a gap timer duration, a gap timer starting time, a gap timer ending time, a gap scan starting time, and a gap scan ending time.

4. The method of claim 1, wherein the traffic characteristic comprises at least one of signal power in the uplink, signal power in the downlink, rate at which data is transmitted from the wireless device to the access node, rate at which data is transmitted from the access node to the wireless device, and application requirements based on an application running on the wireless device.

5. The method of claim 1, wherein estimating the anticipated data burst comprises calculating an estimated gap ending time of each of the plurality of wireless devices based on the associated measurement gap criteria.

6. The method of claim 1, wherein calculating the data burst factor comprises determining a data rate at which each of the plurality of wireless devices is currently transmitting and determining an amount of time each of the plurality of wireless devices was buffering data during a scanning period.

7. A method of managing uneven data flow in a wireless communication system, comprising:
   receiving a load parameter of an access node;
   receiving a first measurement gap criteria associated with a first wireless device in communication with the access node;

determining a second measurement gap criteria associated with a second wireless device in communication with the access node;

determining, at an inspection node, a first traffic characteristic associated with the first wireless device;

determining, at the inspection node, a second traffic characteristic associated with the second wireless device;

monitoring a buffer associated with the access node during overlapping scan gaps of the first wireless device and the second wireless device to calculate an anticipated data burst, wherein the anticipated data burst is calculated based on the load parameter and the first and second measurement gap criterias;

calculating an uneven flow factor based on the anticipated data burst;

determining an adjusted measurement gap criteria for the access node based on the calculated uneven flow factor.

8. The method of claim 7, wherein the load parameter comprises at least one of maximum path loss between the access node and the first and second wireless devices and a target loading criteria.

9. The method of claim 7, wherein the measurement gap criteria comprises at least one of a gap pattern, a gap timer duration, a gap timer starting time, a gap timer ending time, a gap starting time, and a gap ending time.

10. The method of claim 7, wherein the traffic characteristic comprises at least one of signal power in the uplink, signal power in the downlink, data rate associated with the wireless device, and application requirements based on an application running on the first and second wireless devices.

11. The method of claim 10, wherein the application requirements based on the application running on the first and second wireless devices comprises a minimum data rate required by an application running on the first wireless device, a minimum data rate required by an application running on the second wireless device, a maximum permitted data delay required by an application running on the first wireless device, a maximum permitted data delay required by an application running on the second wireless device, a minimum throughput required by an application running on the first wireless device, a minimum throughput required by an application running on the second wireless device, a minimum error rate required by an application running on the first wireless device, a minimum error rate required by an application running on the second wireless device, a maximum data loss rate required by an application running on the first wireless device, a maximum data loss rate required by an application running on the second wireless device, a type of application running on the first wireless device, a type of application running on the second wireless device, a modulation and coding scheme used by the application running on the second wireless device.

12. The method of claim 7, wherein determining the adjusted measurement gap criteria comprises:

determining a sequence of anticipated data bursts over a predetermined period of time; and, determining a median anticipated data burst of the sequence of anticipated data bursts over the predetermined period of time.

13. The method of claim 12, further comprising transmitting the adjusted measurement gap to the first wireless device based on the median anticipated data burst of the sequence of anticipated data bursts over the predetermined period of time.

14. The method of claim 12, further comprising transmitting the adjusted measurement gap to the first wireless device and the second wireless device based on the median data burst of the sequence of anticipated data burst over the predetermined period of time.

15. A system for providing wireless communication to a wireless device, comprising:

a processing node configured to:

determine a load parameter of an access node;

receive a measurement gap criteria associated with each of a plurality of wireless devices in communication with the access node;

receive, from an inspection node, a traffic characteristic associated with each of the plurality of wireless devices;

monitor a buffer associated with each of the plurality of wireless devices during overlapping scan gaps to estimate an anticipated data burst, wherein the anticipated data burst is estimated based on the determined load parameter, the measuring gap criterias, and the traffic characteristics;

calculate a data burst factor based on the estimated data burst;

modify the measurement gap criteria for at least one wireless device based on the calculated data burst factor; and transmit the modified measurement gap criteria to the at least one wireless device.

16. The system of claim 15, wherein the load parameter comprises at least one of maximum path loss between the access node and each of the plurality of wireless devices and a target loading criteria.

17. The system of claim 15, wherein the measurement gap criteria comprises at least one of a gap pattern, a gap timer duration, a gap timer starting time, a gap timer ending time, a gap starting time, and a gap ending time.

18. The system of claim 15, wherein the traffic characteristic comprises at least one of signal power in the uplink, signal power in the downlink, data rate associated with the wireless device, and an application requirement based on an application running on the wireless device.

19. The system of claim 15, wherein modifying the measurement gap criteria comprises estimating a gap ending time based on the measurement gap criteria and the estimated data burst.

20. The system of claim 19, wherein the estimated data burst comprises the data rate at which each of the plurality of wireless devices is currently transmitting and an amount of time each of the plurality of wireless devices was buffering data during a scanning period.

* * * * *